United States Patent [19]

Nagashima

[11] Patent Number: 4,490,580
[45] Date of Patent: Dec. 25, 1984

[54] SUBSCRIBER LINE CIRCUIT COMPRISING A CONTROLLABLE DC/DC CONVERTER AS A BATTERY FEED CIRCUIT

[75] Inventor: Kunio Nagashima, Tokyo, Japan

[73] Assignee: Nippon Electric Co., Ltd., Tokyo, Japan

[21] Appl. No.: 418,658

[22] Filed: Sep. 16, 1982

[30] Foreign Application Priority Data

Sep. 28, 1981 [JP] Japan ................. 56-153258

[51] Int. Cl.$^3$ ............................................. H04B 3/36
[52] U.S. Cl. .............................. 179/18 FA; 179/16 F
[58] Field of Search ............ 179/18 FA, 16 F, 170 D, 179/2 C

[56] References Cited

U.S. PATENT DOCUMENTS 4,254,305 3/1981 Treiber ........................ 179/16 F Primary Examiner—Gene Z. Rubinson
Assistant Examiner—James L. Dwyer
Attorney, Agent, or Firm—Laff, Whitesel, Conte & Saret

[57] ABSTRACT

A subscriber line circuit comprises a controllable DC to DC converter (41) for producing a converter output signal which becomes a loop signal comprising a DC signal and/or a communication signal of a communication frequency band. First and second voltage signals are dependent (51, 69) on the current and the voltage of the loop signal, respectively. One of the voltage signals is amplified (71) with different transfer functions at DC and in the communication frequency band. The converter is controlled (85-86) by an error between a first sum (81) of the amplified signal and the other voltage signal and a second sum (82) of a reference voltage ($E_O$) and a signal supplied from an output (27) of an exchange. A subtractor (92) supplies a difference between the exchange output signal and the second voltage signal to an input (25) of the exchange. Preferably, terminals (16, 17) for connection to a subscriber substation are isolated at DC from terminals (18, 19) for connection to the exchange input and output.

4 Claims, 12 Drawing Figures

SUBSCRIBER LINE CIRCUIT COMPRISING A CONTROLLABLE DC/DC CONVERTER AS A BATTERY FEED CIRCUIT

BACKGROUND OF THE INVENTION

This invention relates to a subscriber line circuit which comprises a battery feed circuit and is for connection to a subscriber substation, such as a telephone set, through a two-wire line and to an input and an output terminal of an exchange.

Such a subscriber line circuit, also called a subscriber line interface circuit, is for use in an exchange office in supplying a battery feed current to the subscriber substation from a DC power source which is usually a storage battery installed in the exchange office. The subscriber line circuit is furthermore for use in transmitting a first communication signal from the subscriber substation to the input terminal of the exchange and a second communication signal from the output terminal of the exchange to the subscriber substation. The first and/or the second communication signal is usually superimposed on the battery feed current. Inasmuch as such a superposition is delivered between the subscriber line circuit and the subscriber substation through the two-wire line, the battery feed current and/or the first and/or the second communication signal will herein be named a loop signal. The exchange may either be a telephone exchange or a data exchange.

As will later be described with reference to one of twelve figures of the accompanying drawing, a conventional subscriber line circuit of the type described comprises a hybrid transformer comprising, in turn, first through third windings. The first winding is for connection to the subscriber substation and is used as a part of the battery feed circuit which additionally comprises resistors for limiting the battery feed current. First ends of the second and the third windings are for connection to the input and the output terminals of the exchange, respectively. Second ends of the second and the third windings are connected to each other and to a balancing network. A combination of the hybrid transformer and the balancing network is primarily for carrying out two-wire/four-wire conversion.

The hybrid transformer must comprise a large-sized and accordingly heavy magnetic core. The resistors are appreciably heated by the battery feed current and thereby result in a considerably poor utilization factor of the DC power source particularly when the subscriber substation is not far away from the exchange office. The hybrid transformer and the resistors have made it difficult to manufacture the subscriber line circuit by resorting to the integrated semiconductor circuit technique.

SUMMARY OF THE INVENTION

It is therefore a principal object of the present invention to provide a subscriber line circuit which is compact.

It is another principal object of this invention to provide a subscriber line circuit of the type described, which is light-weighted.

It is still another principal object of this invention to provide a subscriber line circuit of the type described, which is of a small power consumption.

It is yet another principal object of this invention to provide a subscriber line circuit of the type described, which is readily manufactured by the integrated semiconductor circuit technique.

It is a subordinate object of this invention to provide a subscriber line circuit of the type described, which is capable of withstanding a surge which may unexpectedly be supplied onto a two-wire line connected to the subscriber line circuit.

It is possible to specify that a subscriber line circuit to which this invention is applicable, is for delivering a loop signal of a variable voltage and a variable current to a subscriber substation through a two-wire line in response to a DC power and for supplying an exchange input signal to an input terminal of an exchange when the loop signal comprises a first communication signal delivered from the subscriber substation in a communication frequency band which is higher than a lower frequency band and that the subsciber line circuit is responsive to an exchange output signal supplied from an output terminal of the exchange for making the loop signal comprise a second communication signal of the communication frequency band when the exchange output signal is in the communication frequency band.

According to this invention, the above-specified subscriber line circuit is for connection to a reference voltage source and comprises a controllable DC to DC converter circuit responsive to the DC power for producing a converter output signal, first signal producing means responsive to the variable current for producing a first output signal respresentative of the variable current, second signal producing means responsive to the variable voltage for producing a second output signal representative of the variable voltage, processing means having first and second transfer functions in the lower and the communication frequency bands, respectively, for processing a predetermined one of the first and the second output signals with the first and the second transfer functions to produce a processed signal, first adding means for adding the processed signal to the other of the first and second output signals to produce a first sum signal, second adding means for adding the reference voltage to the exchange output signal to produce a second sum signal, a blocking capacitor responsive to the second output signal for producing a capacitor output signal, difference calculating means for calculating a difference between the exchange output signal and the capacitor output signal to produce a difference signal, and controlling means responsive to the first and the second sum signals for controlling the DC to DC converter circuit so as to render the first and the second sum signals substantially equal to each other and thereby to make the converter output signal and the difference signal provide the loop signal and the exchange input signal, respectively.

BRIEF DESCRIPTION OF THE DRAWING

FIG. 1, shows another current detecting circuit preferred for use in the subscriber line circuit depicted in FIG. 8, together with adjacent circuitry;

DESCRIPTION OF THE PREFERRED EMBODIMENTS

Figure 1:
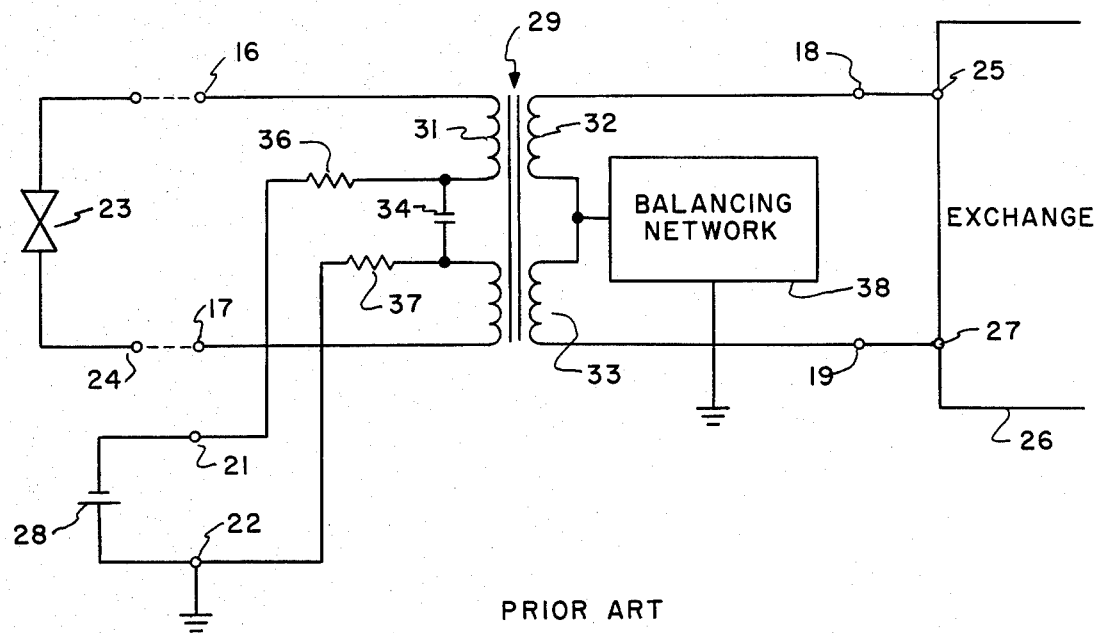
FIG. 1 shows a conventional subscriber line circuit together with related parts of a telephone exchange network.

Referring to FIG. 1, a conventional subscriber line circuit will be described at first in order to facilitate an understanding of the present invention. The subscriber line circuit is for use in an exchange office and has first through fourth circuit terminals 16, 17, 18, and 19 and first and second power supply terminals 21 and 22.

The first and the second circuit terminals 16 and 17 are for connection to a subscriber substation 23, exemplified as a telephone set, through a two-wire or telephone line 24. The third circuit terminal 18 is for connection to an input terminal 25 of an exchange 26 installed in the exchange office. The fourth circuit terminal 19 is for connection to an output terminal 27 of the exchange 26. The power supply terminals 21 and 22 are for connection across a DC power supply 28, such as a storage battery installed in the exchange office. It is usual that the first and the second power supply terminals 21 and 22 are connected to negative and positive terminals of the power supply 28, respectively, and that the positive terminal is grounded. In this event, the first power supply terminal 21 is supplied with a DC power which is negative with respect to ground.

The subscriber line circuit comprises a hybrid transformer 29 comprising a magnetic core and first through third windings 31, 32, and 33 wound around the magnetic core in the manner known in the art. The first winding 31 is divided into two partial windings, between which a bypass capacitor 34 is interposed.

A pair of free ends of the respective partial windings of the first winding 31, is connected to the first and the second circuit terminals 16 and 17, respectively. A first current limiting resistor 36 is interposed between one of a pair of electrodes of the bypass capacitor 34 and the first power supply terminal 21. A second current limiting resistor 37 is interposed between the other electrode of the bypass capacitor 34 and the second power supply terminal 22. The first winding 31 and the current limiting resistors 36 and 37 are for use as a battery feed circuit for delivering a loop signal to the subscriber substation 23 through the two-wire line 24. Under the circumstances, the loop signal is a DC current and is herein called a battery feed current. The resistors 36 and 37 are appreciably heated particularly when the two-wire line 24 is not long.

First ends of the second and the third windings 32 and 33 are connected to the third and the fourth circuit terminals 18 and 19, respectively. Second ends of the windings 32 and 33 are connected to each other and to one end of a balancing network 38 having the other end grounded. The balancing network 38 has an impedance matched to that of a combination of the subscriber substation 23 and the two-wire line 24.

The loop signal flowing through the battery feed cicuit, the two-wire line 24, and the subscriber substation 23, may at times comrise a first communication signal which is in a communication frequency band, such as from 400 Hz to 3 kHz, and is generated in the subscriber substation 23 to flow through the two-wire line 24, the partial windings of the first winding 31, and the bypass capacitor 34 interposed between the partial windings. Responsive to the first communication signal delivered to the subscriber line circuit in a balanced relationship as regards ground, an exchange input signal is developed across the second winding 32 in an unbalanced relationship to ground and is supplied to the exchange input terminal 25 through the third circuit terminal 18. The exchange input signal is delivered to a subscriber substation (not shown) of a remote party through the exchange 26.

An exchange output signal is supplied to the fourth circuit terminal 19 from the exchange output terminal 27. The exchange output signal, as herein named, may ordinarily be zero or quiescent and may at times be an actual signal of the communication frequency band. Such an actual signal is produced by the exchange 26 when a communication signal is delivered thereto from a certain subscriber substation (not shown), which may be the subscriber substation of the above-mentioned remote party. The exchange output signal is supplied across the third winding 33 in an unbalanced relationship to ground. Supplied with such an exchange output signal of the communication frequency band, the subscriber line circuit makes the loop signal comprise a second communication signal of the communication frequency band. The second communication signal is delivered to the subscriber substation 23 in a balanced relationship to ground.

The balancing network 38 is for making a magnetic field generated by the exchange output signal supplied across the third winding 33 and another magnetic field generated by the second communication signal developed across the first winding 31 cancel each other. Substantially no signal voltage is thereby developed across the second winding 32 to be fed back, through the exchange 26, to the subscriber substation from which a communication signal is delivered to the exchange 26 to result in the exchange output signal under consideration.

As thus far been described, the subscriber line circuit carries out conversion between a two-wire-line signal and a four-wire-line signal, usually called two-wire to four-wire conversion in the art. At the same time, the subscriber line circuit carries out conversion between a signal balanced with respect to ground and another signal unbalanced as regards ground, usually named balanced to unbalanced conversion.

In the loop signal, the first and/or the second connunication signal may or may not be superimposed on the DC or battery feed current. It is, however, usual that the first and/or the second communication signal is superposed on the DC current. Such a loop signal is deteriorated if saturation occurs in the magnetic core of the hybrid transformer 29. The magnetic core must therefore be large-sized. The subscriber line circuit accordingly becomes bulky and heavy.

Figure 2:
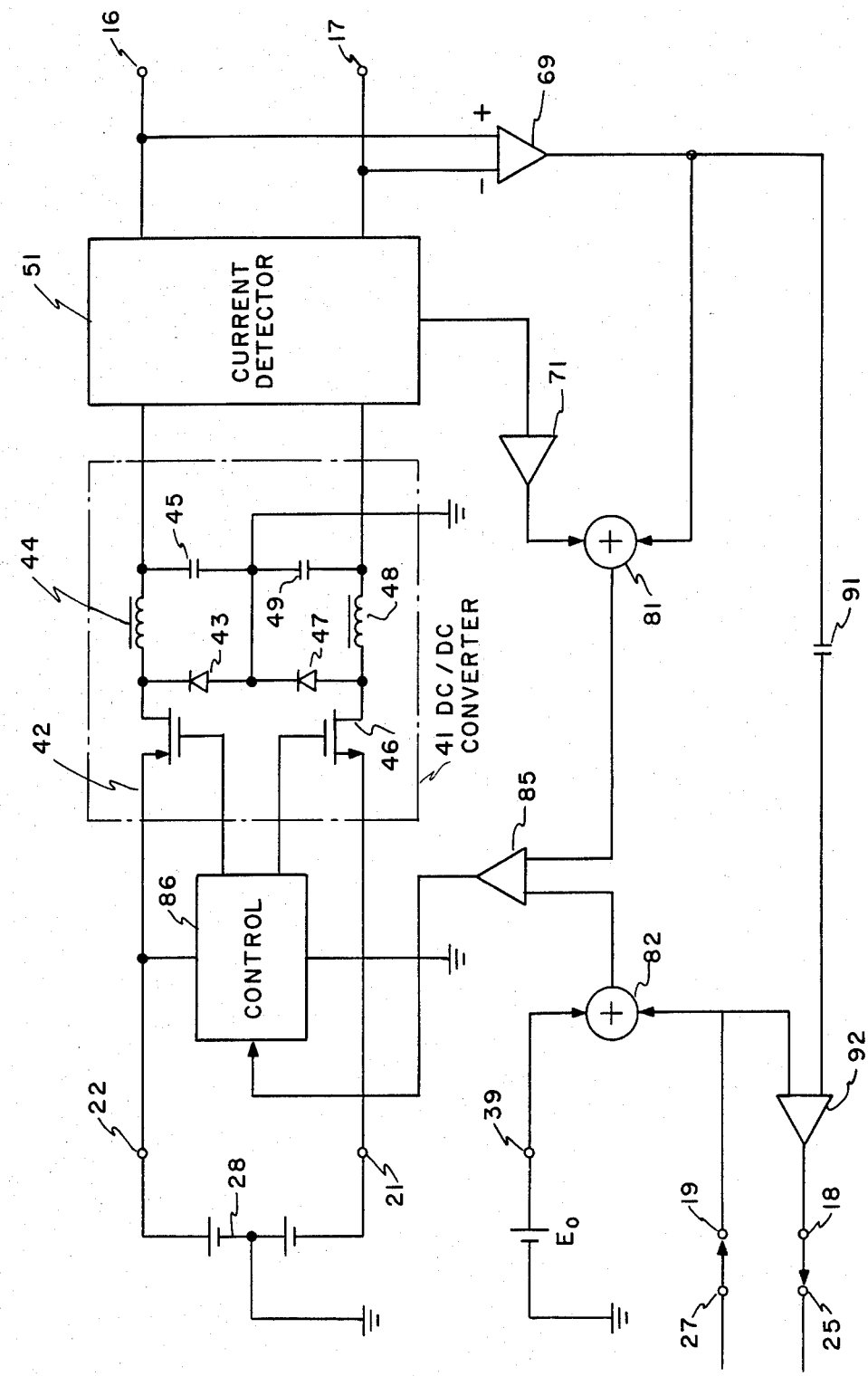
FIG. 2 shows a subscriber line circuit according to a first embodiment of the instant invention together with a DC power source and a reference voltage source and related circuitry.

Referring to FIG. 2, a subscriber line circuit according to a first embodiment of this invention has first through fourth circuit terminals 16 to 19 and first and second power supply terminals 21 and 22. As described with reference to FIG. 1, these terminals 16 through 19 and 21 and 22 are for connection to a subscriber substation 23 through a two-wire line 24, an input terminal 25 of an exchange 26, an output terminal 27 thereof, and negative and positive terminals of a DC power supply 28, respectively. It is to be noted here that the positive terminal of the power supply 28 is not grounded but that the power supply 28 has an intermediate tap grounded. Even in this event, the subscriber line circuit is supplied with a DC power. The subscriber line circuit additionally has a terminal 39 for connection to a reference voltage source. The terminal 39 is supplied with a reference voltage $E_O$, which will become clear as the description proceeds and which may be $-48$ volts.

The subscriber line circuit comprises a controllable DC to DC converter circuit 41 responsive to the DC power supplied through the first and the second power supply terminals 21 and 22 for producing a converter output signal. In the example being illustrated, the DC to DC converter circuit 41 is composed of first and second converter parts which are depicted nearer to the top and the bottom of the figure, respectively, and are symmetric with respect to each other on both sides of ground. The first and the second converter parts are connected to the second and the first power supply terminals 22 and 21, respectively.

The first converter part comprises a p-channel field effect transistor 42 having a source electrode connected to the second power supply terminal 22 and drain and gate electrodes. A first diode 41 has a cathode connected to the drain electrode of the p-channel field effect transistor 42 and an anode grounded. A first choke coil 44 has a first end connected to a point of connection between the p-channel field effect transistor drain electrode and the first diode cathode. A second end of the first choke coil 44 is connected to a first electrode of a first smoothing capacitor 45 having a second electrode grounded.

The second converter part comprises an n-channel field effect transistor 46 having a source electrode connected to the first power supply terminal 21 and drain and gate electrodes. A second diode 47 has an anode connected to the drain electrode of the n-channel field effect transistor 46 and a cathode grounded. A second choke coil 48 has a first end connected to a point of connection between the n-channel field effect transistor drain electrode and the second diode anode. A second end of the second choke coil 48 is connected to a first electrode of a second smoothing capacitor 49 having a second electrode grounded.

As will later be described in detail, first and second on-off control signals are concurrently supplied to the gate electrodes of the p-channel and the n-channel field effect transistors 42 and 46, respectively. A combination of the p-channel and the n-channel field effect transistors 42 and 46 serves as a control or switching element for the DC to DC converter circuit 41. The first and the second choke coils 44 and 48 serve as first and second inductance elements, respectively, for storing the electric energy. The DC to DC converter circuit 41 thereby produces the converter output signal across a series connection of the first and the second smoothing capacitors 45 and 49, namely, between a first point of connection between the first smoothing capacitor 45 and the first choke coil 44 and a second point of connection between the second smoothing capacitor 49 and the second choke coil 48.

The converter output signal provides a loop signal which consists only of a battery feed current $I_L$ of the type described before, neither when the loop signal comprises a first communication signal delivered as a variable current $i_1$ from the subscriber substation 23 in a communication frequency band to make the subscriber line circuit produce an exchange input signal $e_i$ nor when the subscriber line cicuit is supplied with an exchange output signal $e_o$ in the communication frequency band to make the loop signal comprise a second communication signal of another variable current $i_2$ of the communication frequency band. The converter output signal has equal positive and negative values with respect to ground at the first and the second points of connection, respectively, irrespective of presence and absence of the first and/or the second communication signal.

A first signal producing circuit or current detector 51 connects the first and the second circuit terminals 16 and 17 with the first and the second points of connection in the DC to DC converter circuit 41, respectively. Responsive to the loop signal, the first signal producing circuit 51 produces a first output signal representative of the loop signal. More specifically, the loop signal has a variable voltage and a variable current which primarily result from the first and/or the second communication signal. The first output signal represents the variable current, which may be either of the above-mentioned variable currents $i_1$ and $i_2$ or may be a combination of the variable currents $i_1$ and $i_2$.

Figure 3:
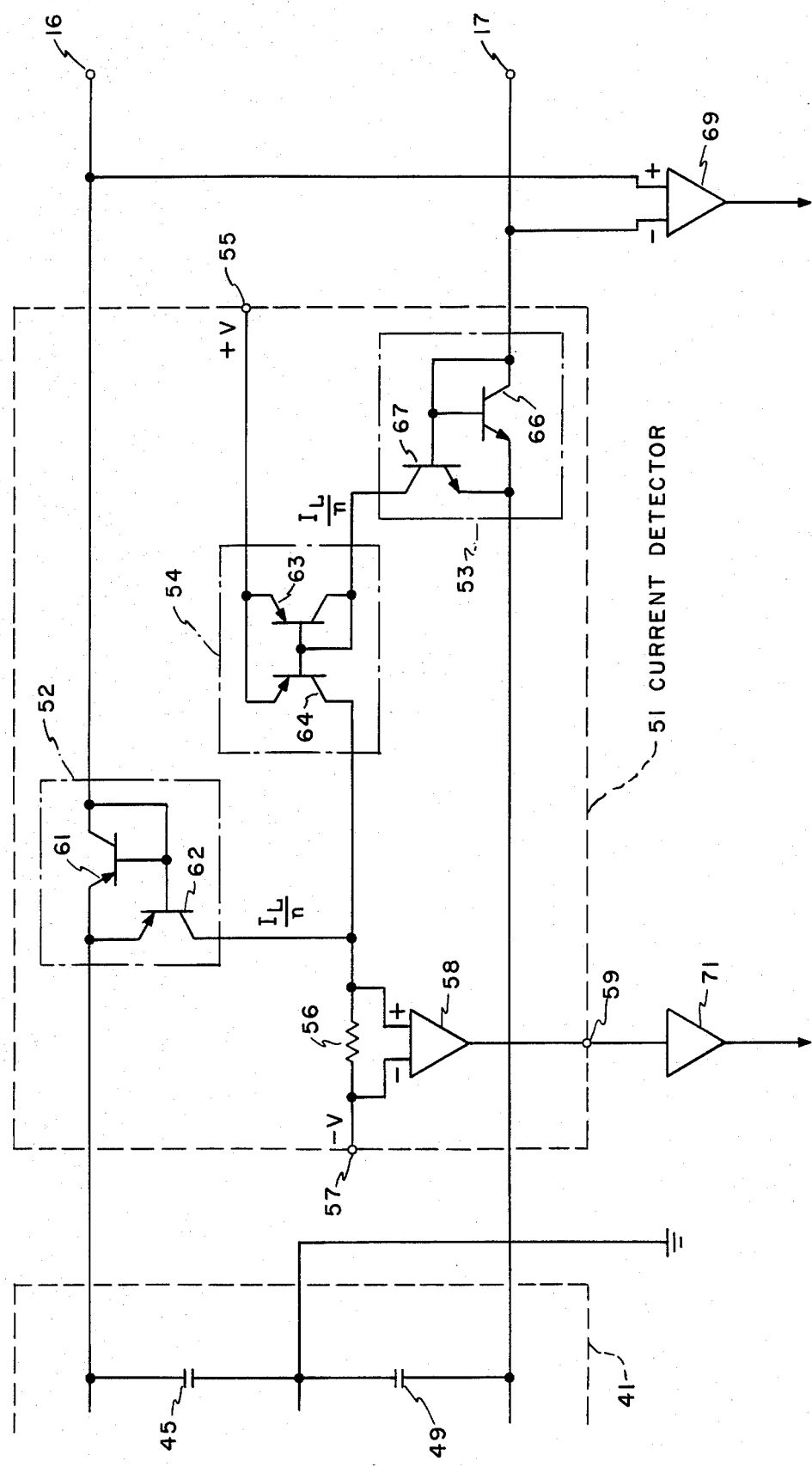
FIG. 3 shows a current detecting circuit for use in the subscriber line circuit depicted in FIG. 2, together with adjacent circuitry.

Turning to FIG. 3 for a short while, an exemple of the first signal producing circuit 51 comprises a first current miller circuit 52 interposed between the first point of connection and the first circuit terminal 16. A second current miller circuit 53 is interposed between the second point of connection and the second circuit terminal 17. A third current miller circuit 54 is connected to the second current miller circuit 53 and to a first local power supply terminal 55, which is for connection to a positive power supply known in the integrated semiconductor circuits. A resistor 56 has a first end connected to the first and the third current miller circuits 52 and 54 and a second end connected to a second local power supply terminal 57, which is for connection to a negative power supply. A differential amplifier 58 has noninverted and inverted input terminals connected to the first and the second ends of the resistor 56, respectively, and a first signal producing circuit output terminal 59 at which the first output signal is produced as will shortly be described.

The first current miller circuit 52 comprises a first PNP transistor 61 having an emitter electrode connected to the first point of connection in the DC to DC converter circuit 41 and collector and base electrodes connected in common to the first circuit terminal 16. A second PNP transistor 62 has an emitter electrode connected to the first point of connection, a collector electrode connected to the first end of the resistor 56, a gate electrode connected to the first circuit terminal 16, and a base-emitter junction area which is equal to 1/n of that of the first PNP transistor 61, where n represents a predetermined number known in the art.

The third current miller circuit 54 comprises a third PNP transistor 61 having an emitter electrode connected to the first local power supply terminal 55 and collector and base electrodes connected in common to the second current miller circuit 53 as will presently be described. A fourth PNP transistor 64 has an emitter electrode connected also to the first local power supply terminal 55, a collector electrode connected to the first end of the resistor 56, a gate electrode connected to the gate electrode of the third PNP transistor 63, and a base-emitter junction area which is equal to that of the third PNP transistor 63.

The second current miller circuit 53 comprises a first NPN transistor 66 having an emitter electrode connected to the second point of connection and collector and gate electrodes connected in common to the second circuit terminal 17. A second NPN transistor 67 has an emitter electrode connected to the second point of connection, a collector electrode connected to the collector and the base electrodes of the third PNP transistor 63 and to the gate electrode of the fourth PNP transistor 64, a gate electrode connected to the second circuit terminal 17, and a base-emitter junction area which is equal to 1/n of that of the first NPN transistor 66.

Let the resistance of the resistor 56 be denoted by R. Responsive to the battery feed current $I_L$, a first local current which is equal to $I_L/n$, flows from the collector electrode of the second PNP transistor 62 through the resistor 56. A second local current which is equal to $I_L/n$, flows from the third current miller circuit 54 to the collector electrode of the second NPN transistor 67. Inasmuch as the second local current flows through the emitter-collector junction of the third PNP transistor 63, a third local current which is equal to $I_L/n$, flows from the collector electrode of the fourth PNP transistor 64 through the reristor 56. A voltage drop developed across the resistor 56 is equal to $2RI_L/n$.

Let the differential amplifier 58 have a unit gain. When the current-to-voltage conversion gain of the first signal producing circuit 51 is designated by r:

$r = 2R/n.$

Referring back to FIG. 2, a second signal producing circuit or voltage detector 69 is responsive to the loop signal for producing a second output signal representative of the variable voltage of the loop signal, namely, the variable voltage of the first and the second communication signals, one or both of which are transmitted through the two-wire line 24 (FIG. 1). The second signal producing circuit 69 may therefore be a differential amplifier having noninverted and inverted input terminals connected to the first and the second circuit terminals 16 and 17, respectively, a unit gain, and a second signal producing circuit output terminal at which the second output signal is produced.

A two-transfer-function amplifier or processing circuit 71 has first and second transfer functions N(O) and N(f) at DC and in the communication frequency band, respectively. The amplifier 71 is for processing the first output signal to produce a processed or amplified signal.

Figure 4:
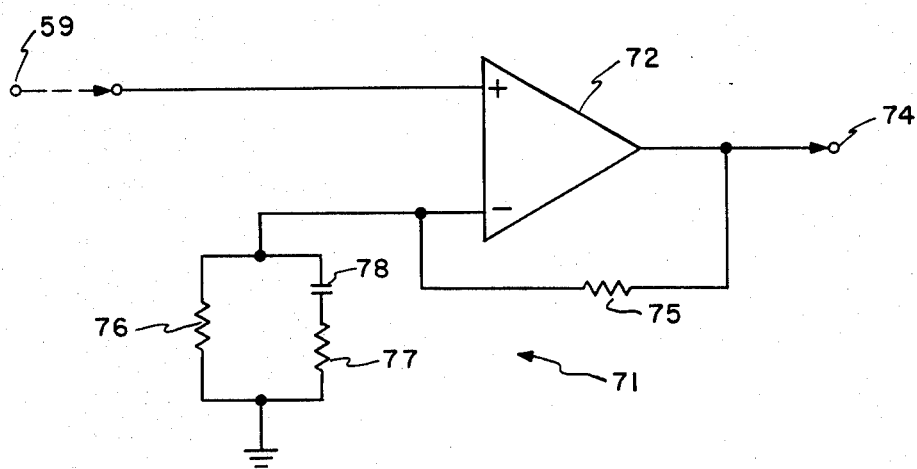
FIG. 4 shows a two-transfer-function amplifier for use in the subscriber line circuit illustrated in FIG. 2.

Turning temporarily to FIG. 4, an example of the two-transfer-function amplifier 71 comprises an operational amplifier 72 having a noninverted input terminal connected to the first signal producing circuit output terminal 59 of the first signal producing circuit 51 and an amplifier output terminal 74 at which the amplified signal is produced in response to the first output signal as will presently become clear. A feedback resistor 75 is interposed between an inverted input terminal of the operational amplifier 72 and the amplifier output terminal 74 thereof. The inverted input terminal is grounded through a parallel connection of a first resistor 76 and a series connection of a second resistor 77 and a blocking capacitor 78. The first and the second transfer functions are given by:

$N(O) = 1 + R_f/R_{s1}$ and $N(f) = 1 + R_f/[R_{s1}R_{s2}(R_{s1} + R_{s2})],$ where $R_f$ represents the resistance of the feedback resistor 75 and $R_{s1}$ and $R_{s2}$, the resistance of the first and the second resistors 76 and 77, respectively.

Referring back to FIG. 2, a first adder 81 is for adding the amplified signal to the second output signal to produce a first sum signal. A second adder 82 is for adding the reference voltage $E_O$ to the exchange output signal to produce a second sum signal.

A controlling circuit comprises an error amplifier 85 responsive to the first and the second sum signals for producing an error signal representative of a difference therebetween. The controlling circuit further comprises a control circuit 86 responsive to the error signal for producing the above-mentioned on-off control signals.

Figure 5:
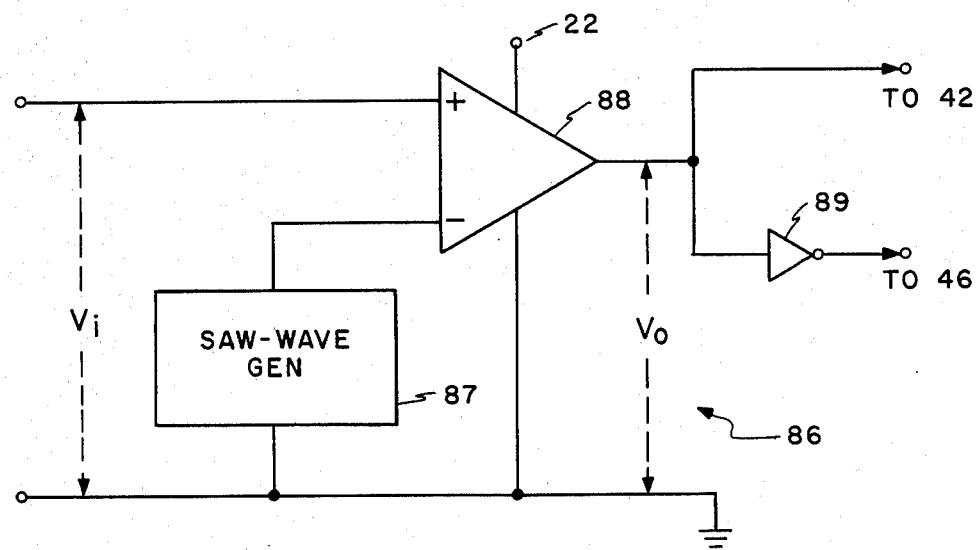
FIG. 5 shows a control circuit for use in the subscriber line circuit depicted in FIG. 2.
Figure 6:
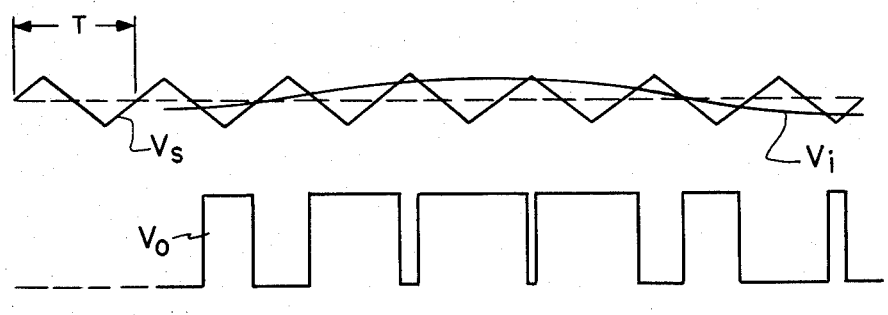
FIG. 6 shows a few signal wave forms for use in describing operation of the control circuit depicted in FIG. 5.

Turning now to FIGS. 5 and 6, the control circuit 86 comprises a saw-wave generator 87 for generating a saw-wave signal $V_s$ that rises above and falls below a reference potential at a frequency 1/T. A comparator 88 has a pair of power supply terminals connected to the second power supply terminal 22 and ground, respectively, and is for comparing the saw-wave signal $V_s$ with the error signal which is now represented by $V_i$. The comparator 88 produces a rectangular-wave signal $V_o$ that has a pulse width variable with the error signal. When the first and the second sum signals are equal to each other, the rectangular-wave signal $V_o$ has a fifty percent duty ratio. The rectangular-wave signal $V_o$ is supplied as the first on-off control signal directly to the gate electrode of the p-channel field effect transistor 42 (FIG. 2) and as the second on-off control signal to the gate electrode of the n-channel field effect transistor 46 through an inverter 89. The first and the second on-off control signals are therefore symmetric with respect to each other on both sides of ground and have a common switching or control frequency which is equal to 1/T.

Referring back to FIG. 2 again, it is now understood that the DC to DC converter circuit 41 makes the converter output signal provide the battery feed current $I_L$ dependent on the DC voltage supplied between the first and the second power supply terminals 21 and 22 when the subscriber line circuit is supplied neither with the exchange output signal in the communication frequency band nor with the first communication signal. Let the controlling circuit comprising the error amplifier 85 and the controller circuit 86 have first and second transfer functions A(O) and A(f) at DC and in the communication frequency band, respectively. The DC voltage developed by the controller output signal between the first and the second circuit terminals 16 and 17 will be denoted by $E_L$. It will readily be understood that the following equality holds at DC:

$$A(O)[E_O-(E_L+rI_LN(O))]=E_L+r_fI_L,$$

where $r_f$ represents the resistance of the first signal producing circuit 51 for the loop signal.

It is usually possible to render:

$$A(O)>>1$$

and $$rN(O)>>r_f.$$

Therefore:

$$E_L=E_O-rI_LN(O).$$

It is understood from the latter equalities that the subscriber line circuit feeds the battery feed current $I_L$ to the subscriber substation 23 through the two-wire line 24 as a constant-voltage source having an electromotive force and a current limiting resistance which are equal to the reference voltage $E_O$ supplied to the voltage supply terminal 39 and equal to a product $rN(O)$ of the current-to-voltage conversion gain r of the first signal producing circuit 51 and the first transfer function $N(O)$ of the two-transfer-function amplifier 71, respectively. It is possible to choose a small resistance and a large transfer function as the current-to-voltage conversion gain r and the first transfer function $N(O)$, respectively. Under the circumstances, most of the electric power consumed in the subscriber line circuit is that wasted in the resistor 56 and is very small. The current limiting resistance $rN(O)$ is usually rendered equal to about 440 ohms.

A blocking capacitor 91 is responsive to the second output signal for producing a capacitor output signal. A subtractor or difference calculator 92 is for calculating a difference between the exchange output signal $e_o$ and the capacitor output signal to produce a difference signal, which is supplied to the third circuit terminal 18 as the exchange input signal $e_i$.

As described heretobefore, the exchange output signal is zero or quiescent when no communication signal reaches the fourth circuit terminal 19 from a remote party through the exchange 26. When the exchange output signal is in the communication frequency band as a result of a communication signal delivered from the remote party to the exchange 26 and then dealt therewith, the signal may appear in the capacitor output signal as a detouring signal through the second adder 82, the error amplifier 85, the control circuit 86, the DC to DC converter circuit 41, current detector 51, the second signal producing circuit 69, and the blocking capacitor 91. The subtractor 92 is for making such an exchange output signal and the detouring signal cancel each other so that the subscriber line circuit may supply substantially no signal to the third circuit terminal 18 in the absence of the first communication signal.

The first communication signal delivered from the subscriber substation 23 between the first and the second circuit terminals 16 and 17 in a balanced relationship as regards ground, is detected by the second signal producing circuit 69 as the second output signal. Supplied with the second output signal, the blocking capacitor 91 produces a capacitor output signal representative of the first communication signal. The capacitor output signal represents also the second communication signal if an exchange output signal is simultaneously supplied to the fourth circuit terminal 19 in the communication frequency band. Responsive to such an exchange output signal and the capacitor output signal, the subtractor 92 produces a difference signal, which is supplied to the third circuit terminal 18 as an exchange input signal. Irrespective of the simultaneous presence and absence of the exchange output signal of the communication frequency band, the exchange input signal represents the first communication signal alone.

When the voltage developed by the first communication signal between the first and the second circuit terminals 16 and 17 is denoted by $e_1$, the following equality holds in the communication frequency band:

$$A(f)[ri_1N(f)-e_1]=e_1-r_fi_1.$$

Therefore:

$$e_1/i_1=[rN(f)A(f)+r_f]/[1+A(f)].$$

This shows that it is possible by selecting the second transfer functions $N(f)$ and $A(f)$ of the two-transfer-function amplifier 71 and of the controlling circuit 85-86 to make the impedance looked from the first and the second circuit terminals 16 and 17 into the subscriber line circuit, have a desired value $e_1/i_1$. Usually, the impedance $e_1/i_1$ is given a value which is equal to 600 ohms or 900 ohms.

Let the voltage developed by the second communication signal between the first and the second circuit terminals 16 and 17 be designated by $e_2$. The following equality holds in the communication frequency band:

$$A(f)[e_o-(e_2+ri_2N(f))]=e_2+r_fi_2.$$

When the two-wire line 24 and the subscriber substation 23 have in total an impedance $Z_L$ in the communication frequency band:

$$e_2=Z_Li_2.$$

Therefore:

$$e_2=e_oA(f)/[A(f)(1+rN(f)/Z_L)+(1+r_f/Z_L)].$$

It is understood that the subscriber line circuit makes the loop signal comprise a second communication signal ($e_2$, $i_2$) in a balanced relationship with respect to ground in response to an exchange output signal $e_o$ supplied to the fourth circuit terminal 19 in an unbalanced relationship to ground. The exchange output signal $e_o$ is supplied as the second communication signal ($e_2$, $i_2$) between the first and the second circuit terminals 16 and 17 with a gain which is equal to $A(f)/[A(f)(1+rN(f)/Z_L)+(1+r_f/Z_L)]$.

Like the conventional subscriber line circuit described in conjunction with FIG. 1, the subscriber line circuit illustrated with reference to FIG. 2 is capable of carrying out delivery of the battery feed current to the subscriber substation 23 through the two-wire line 24 and the two-wire/four-wire conversion accompanied by the balanced/unbalanced conversion and of preventing the exchange output signal from leaking into the exchange input signal. In contrast to the conventional subscriber line circuit, it is possible to avoid the appreciable heating of the current limiting resistor and the bulkiness and the resulting heavy weight of the hybrid transformer 29 (FIG. 1). Each of the first and the second choke coils 44 and 48 may have as small an inductance as several millihenries when the common switching frequency 1/T of the first and the second on-off control signals is about 100 kHz. It is thereby rendered relatively readily feasible to manufacture the subscriber line circuit by the integrated semiconductor circuit technique.

The first and the second smoothing capacitors 45 and 49 may have a common electrostatic capacity of the order of several microfarads. It is possible to make the two-transfer-function amplifier 71 and the controlling circuit comprising the error amplifier 85 and the control circuit 86 have the first transfer functions N(O) and A(O), respectively, in a lower frequency band which may include the DC and the frequencies lower than the communication frequency band.

Figure 7:
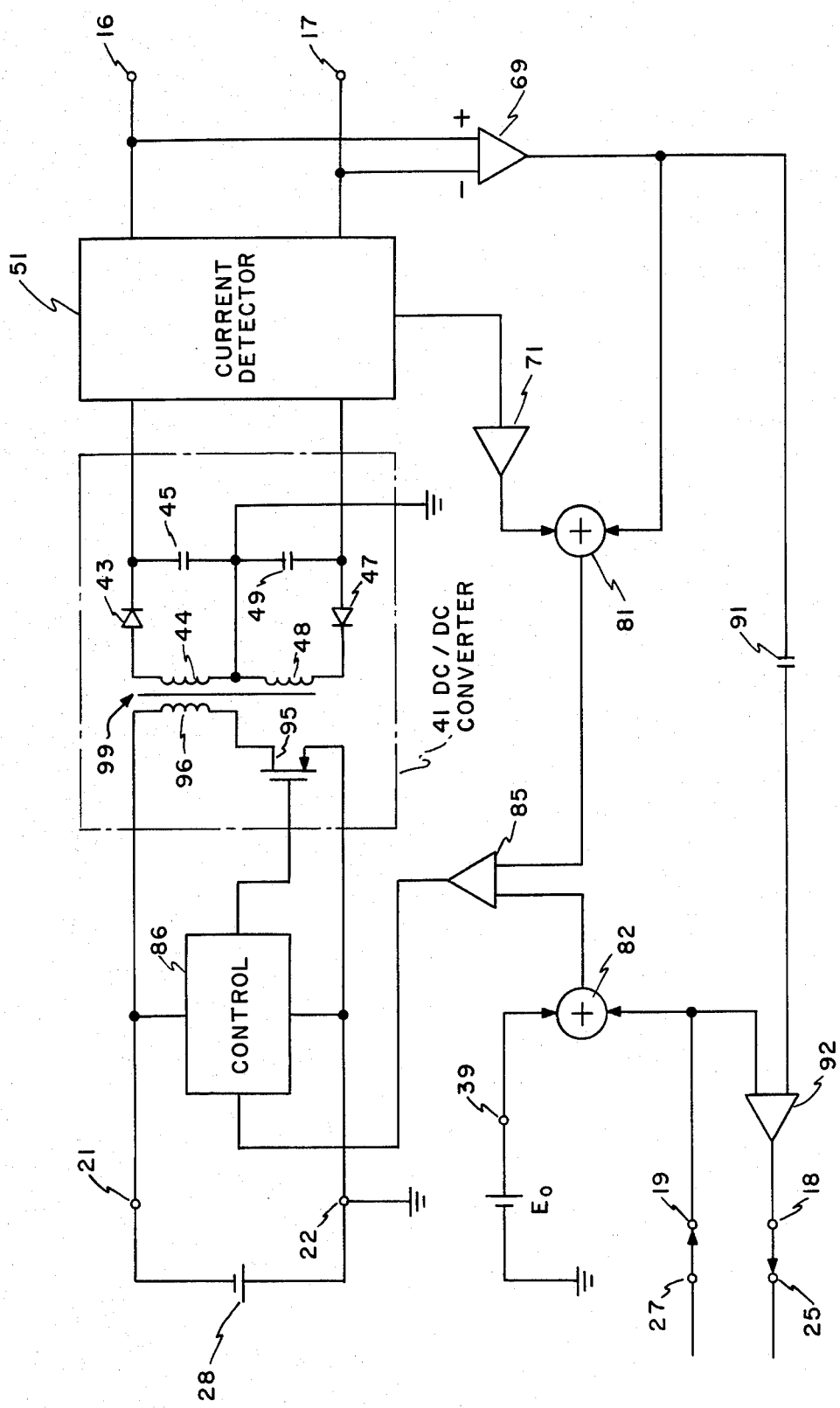
FIG. 7 shows a subscriber line circuit according to a second embodiment of this invention together with related circuitry.

Referring now to FIG. 7, a subscriber line circuit according to a second embodiment of this invention comprises similar parts designated by like reference numerals. The second power supply terminal 22 is grounded as in the subscriber line circuit described in conjunction with FIG. 1.

The controllable DC to DC converter circuit 41 comprises first and second converter elements which are again symmetric with respect to each other on both sides of ground. A p-channel field effect transistor 95 is shared by the first and the second converter elements as a single control element. In the illustrated example, the transistor 95 has a source electrode grounded, a drain electrode connected to the first power supply terminal 21 through a primary winding 96 of a transformer 99, and a gate electrode controlled by a single on-off control signal supplied from the control circuit 86.

The first and the second inductance elements 44 and 48 are used as first and second partial secondary windings of the transformer 99, with a point of connection between the partial secondary windings 44 and 48 grounded. The first diode 43 therefore has the anode connected to a free end of the first partial secondary winding 44. The second diode 47 has the cathode connected to a free end of the second partial secondary winding 48. The first and the second points of connection described in conjunction with FIG. 2, are a point of connection between the cathode of the first diode 43 and the above-mentioned first electrode of the first smoothing capacitor 45 and another point of connection between the anode of the second diode 47 and the first electrode of the second smoothing capacitor 49, respectively.

The control circuit 86 need not comprise the inverter 89 described with reference to FIG. 5. In other respects, the subscriber line circuit being illustrated, is similar to that illustrated with reference to FIGS. 2 through 6.

Figure 8:
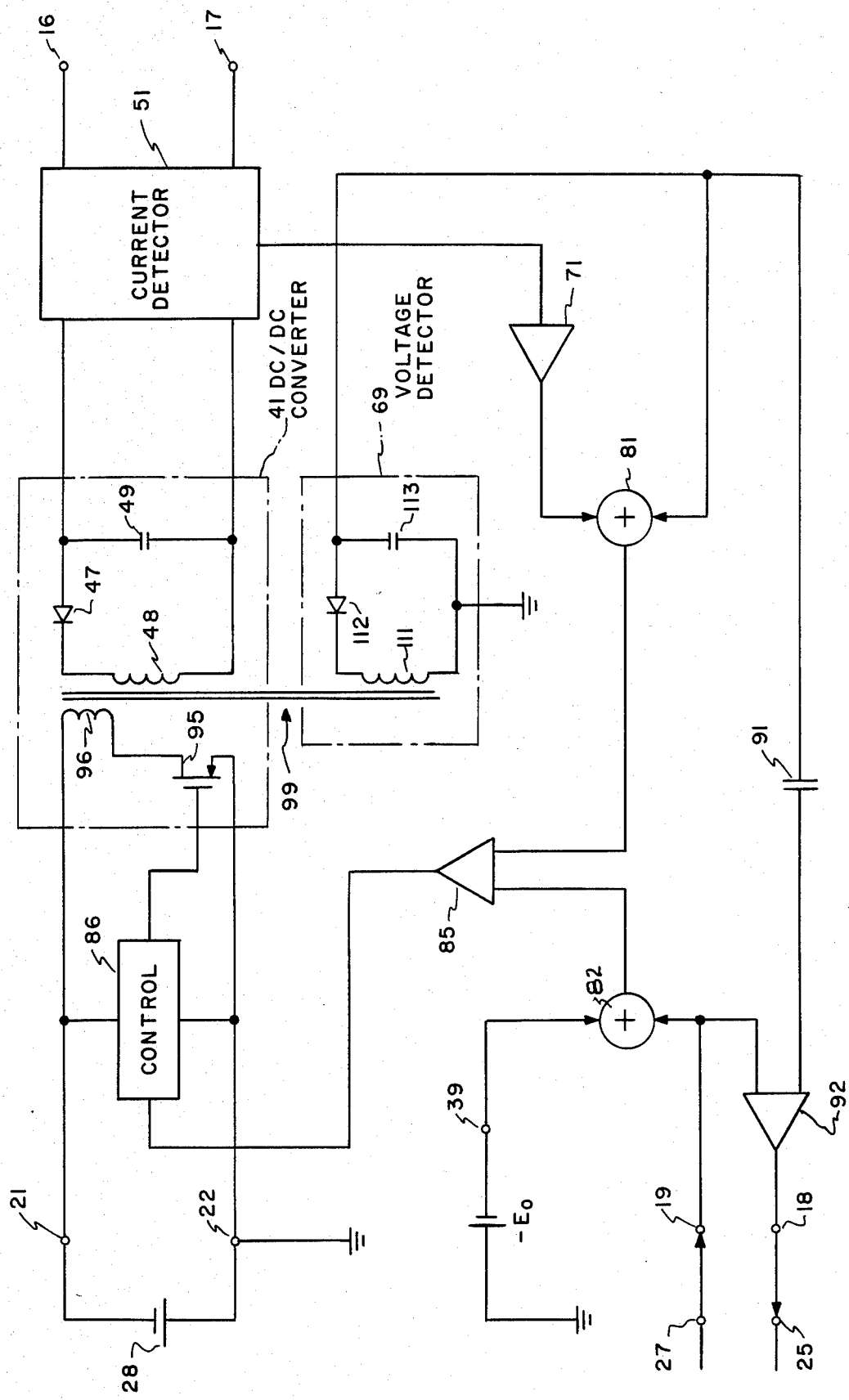
FIG. 8 shows a subscriber line circuit according to a third embodiment of this invention together with related circuitry.

Referring to FIG. 8, a subscriber line circuit according to a third embodiment of this invention again comprises similar parts designated by like reference numerals. In the illustrated example, the controllable DC to DC converter circuit 41 does not comprise the first converter element described in conjunction with FIG. 7 but only the "second" converter element. A positive voltage is used as the reference voltage $E_O$. The converter output signal is developed across the smoothing capacitor 49.

Instead of the differential amplifier described in conjunction with FIGS. 2 and 7, the second signal producing circuit or voltage detector 69 is combined with the DC to DC converter circuit 41 to form an additional converter element, by sharing the transformer 99 with the above-mentioned "second" converter element. More particularly, the second signal producing circuit 69 comprises a tertiary winding 111 of the transformer 99 having one end grounded, an additional diode 112 having a cathode connected to the other end of the tertiary winding 111 and an anode, and an additional smoothing capacitor 113 having a first electrode connected to the anode of the additional diode 112 and a second electrode grounded. The second output signal is obtained across the additional capacitor 113.

When the turn ratio of the tertiary winding 111 to the primary winding 96 is equal to that of the secondary winding 48 to the primary winding 96 and furthermore when a combination of the additional diode 112 and the additional smoothing capacitor 113 has similar characteristics as another combination of the diode 47 and the smoothing capacitor 49 in the above-mentioned "second" converter element, the second output signal has a voltage which is equal to the voltage of the converter output signal.

It is to be noted in FIG. 8 that the diode 47, the inductance element or single secondary winding 48, and the smoothing capacitor 49 of the "second" converter element, have no parts grounded even through the second signal producing circuit 69. In other words, the secondary winding 48 of the transformer 99 floats from ground. It is therefore possible to remove an inphase noise which may be induced onto the two-wire line 24.

Figure 9:
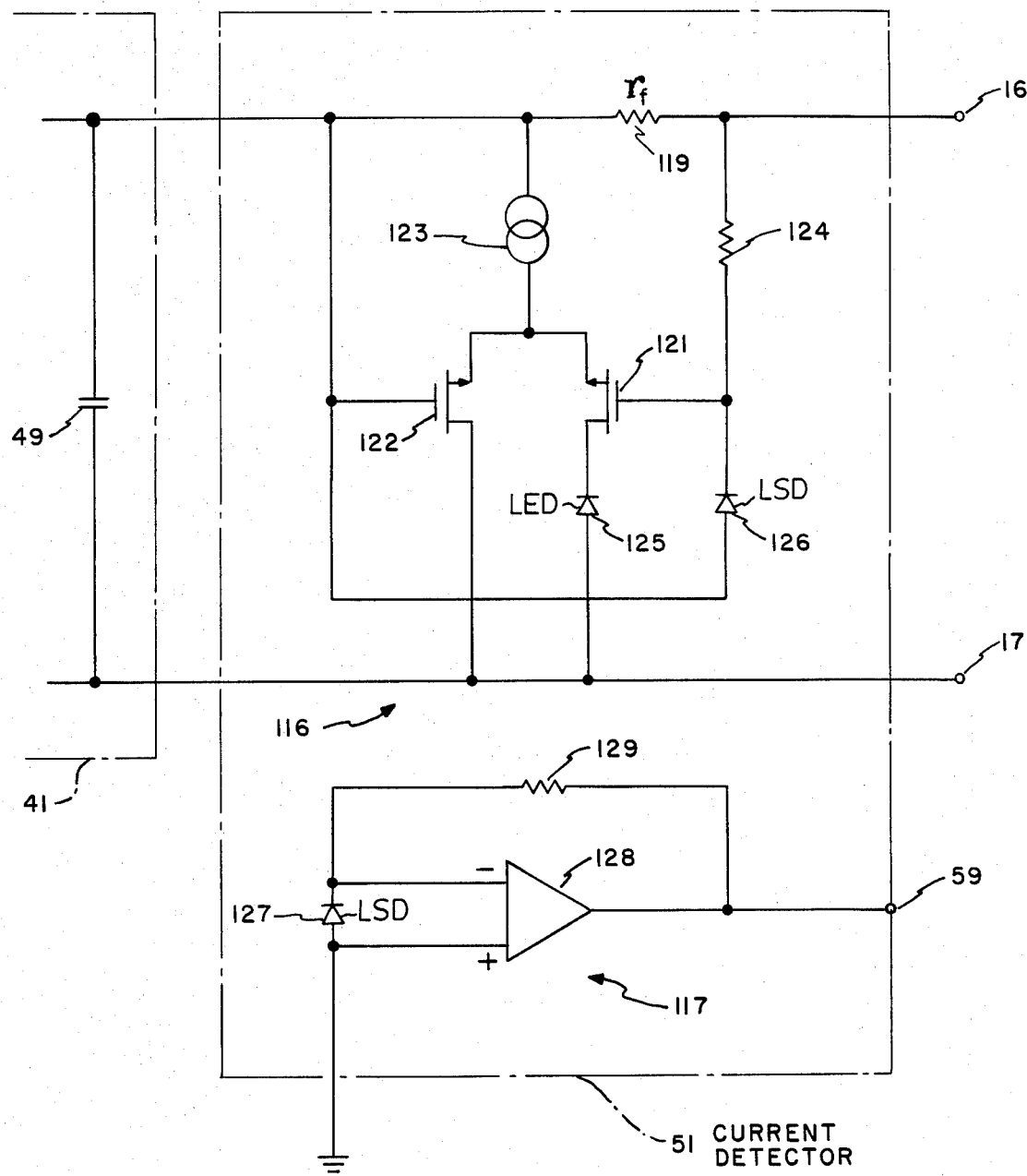
FIG. 9 shows a current detecting circuit preferred for use in the subscriber line circuit illustrated in FIG. 8, together with adjacent circuitry.

Turning to FIG. 9, it is preferred that the first signal producing circuit or current detector 51 comprises primary and secondary parts 116 and 117 which are isolated from each other. This, in turn, isolates in cooperation with the floating converter element the exchange 26 from a combination of the subscriber substation 23 and the two-wire line 24. The subscriber line circuit therefore withstands a surge which may unexpectedly be placed on the two-wire line 24.

In FIG. 9, the primary and the secondary parts 116 and 117 are optically coupled to each other. More particularly, an optoelectric transducer is shared by the primary and the secondary parts 116 and 117.

Referring more specifically to FIG. 9, the primary part 116 comprises an input resistor 119 which has the resistance $r_f$, a first end connected to the first circuit terminal 16, and a second end connected to a point of connection between the anode of the diode 47 in the "second" converter element of the DC to DC converter circuit 41 and the first electrode of the smoothing capacitor 49 thereof. A differential amplifier comprises first and second n-channel field effect transistors 121 and 122 having source electrodes connected in common to the second end of the input resistor 119 through a constant-current circuit 123. The first field effect transistor 121 has a gate electrode connected to the first end of the input resistor 119 through a component resistor 124 and a drain electrode connected to the second circuit terminal 17 through a light emitting diode 125, which has an anode and a cathode connected to the second circuit terminal 17 and the drain electrode under consideration, respectively. The light emitting diode 125 produces optical rays in compliance with the loop signal. The optical rays may either be visible rays or rays near the visible range, such as infrared rays. The second field effect transistor 122 has a drain electrode connected directly to the second circuit terminal 17 and a gate electrode connected to the second end of the input resistor 119 and also to an anode of a first light sensitive diode 126, which has a cathode connected to the gate electrode of the first field effect transistor 121. The first light sensitive diode 126 is optically coupled to the light emitting diode 125.

The loop signal, which may be the battery feed current and/or the first and/or the second communication signal, will now be denoted by $i_L$. The differential amplifier is for detecting an input voltage $v_i$ developed across the input resistor 119 by the loop signal $i_L$. The input voltage $v_i$ is equal to a product $r_f i_L$. A first photoelectric current $i_{p1}$ which flows through the first light sensitive diode 126, is given by:

$$i_{p1} = v_i/R_g = r_f i_L/R_g,$$

where $R_g$ represents the resistance of the component resistor 124.

The secondary part 117 comprises a second light sensitive diode 127 having an anode and a cathode and optically coupled to the light emitting diode 125. A negative feedback amplifier is composed of an operational amplifier 128 and a parallel resistor 129. The operational amplifier 128 has noninverted and inverted input terminals connected to the anode and the cathode of the second light sensitive diode 127, respectively, and an output terminal which serves as the first signal producing circuit output terminal 59. A second photoelectric current $i_{p2}$ which flows through the second light sensitive diode 127 is given by:

$$i_{p2} = v_o/R_k,$$

where $R_k$ represents the resistance of the parallel resistor 129 and $v_o$, the voltage which the first output signal has at the first signal producing circuit output terminal 59.

When the first light sensitive diode 126 has characteristics sufficiently matched to those of the second light sensitive diode 127, the first photoelectric current $i_{p1}$ is equal to the second photoelectric current $i_{p2}$. Therefore:

$$v_o = r_f i_L R_k/R_g.$$

It is understood that the voltage $v_o$ of the first output signal is proportional to the loop signal $i_L$ and that the current-to-voltage conversion gain r is given by:

$$r = r_f R_k/R_g.$$

Figure 10:
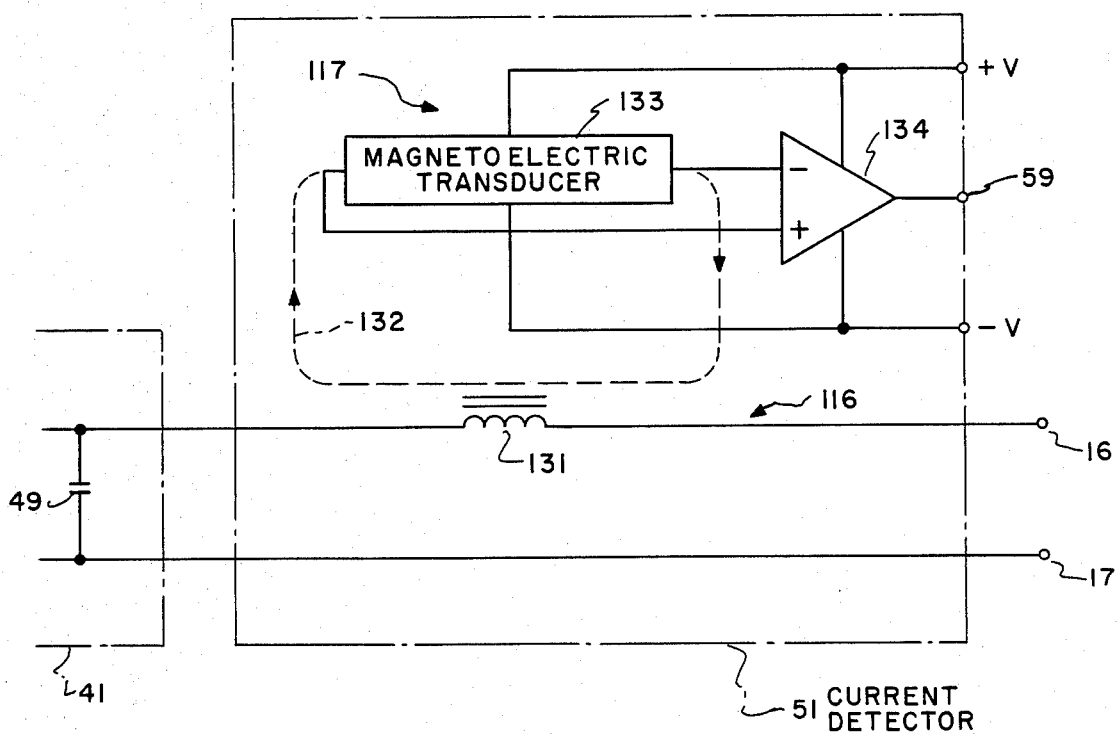
FIG. 10, drawn below

Turning to FIG. 10, another preferred example of the first signal producing circuit or current detector 51 comprises primary and secondary parts 116 and 117 which are electromagnetically coupled to each other. The primary part 116 simply comprises an inductance element 131 responsive to the loop signal for generating a magnetic field 132 which is proportional to the loop signal.

The secondary part 117 comprises a magnetoelectric transducer 133 in the magnetic field 132. The magnetoelectric transducer 133 may be a Hall element responsive to the magnetic field 132 for developing a potential difference thereacross. The potential difference is amplified by a differential amplifier 134 and thence supplied to the first signal producing circuit output terminal 59 as the first output signal.

Figures 11, 12:
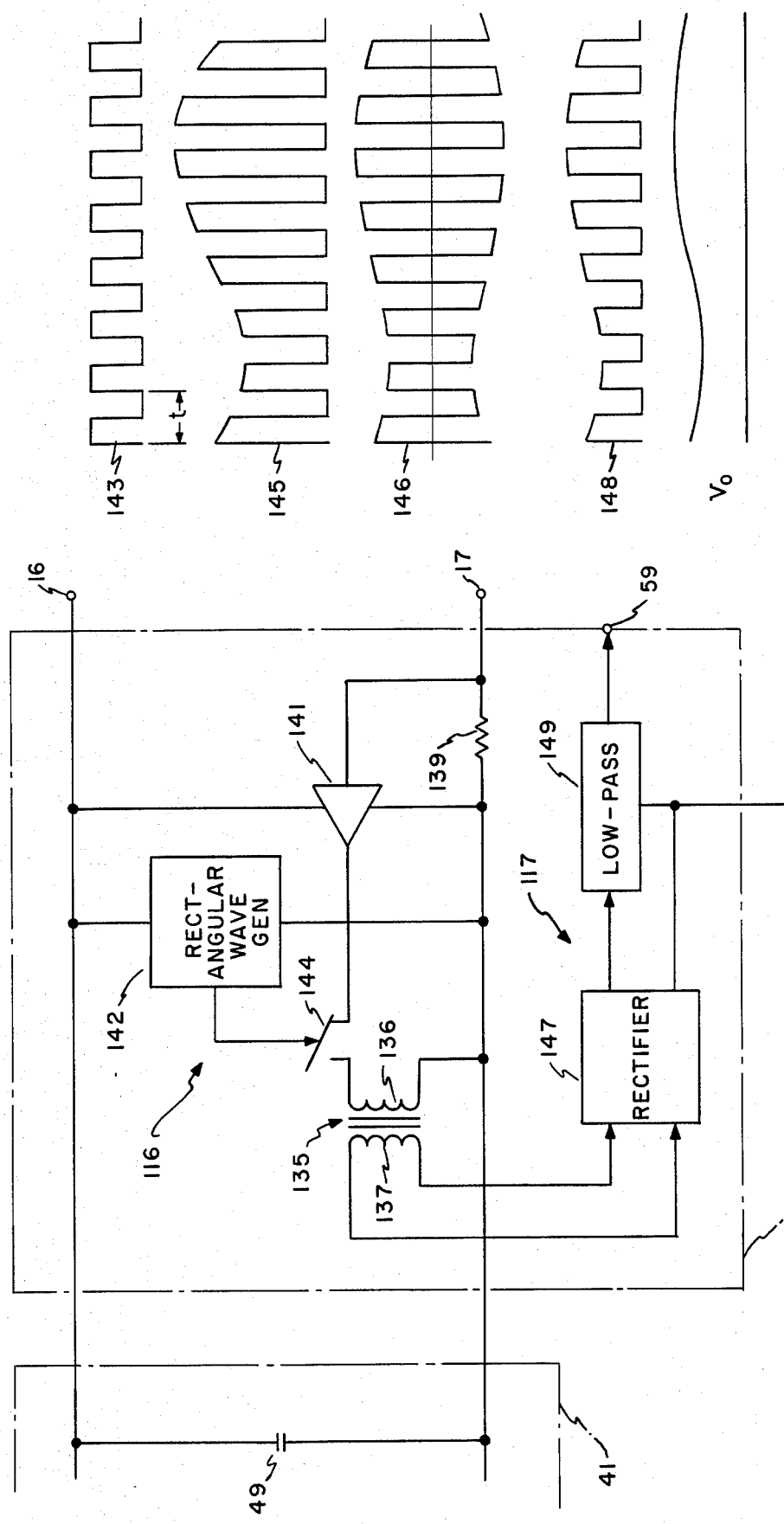
FIG. 11 shows still another current detecting circuit preferred for use in the subscriber line circuit illustrated in FIG. 8, together with adjacent circuitry.
FIG. 12 shows several signal wave forms for use in describing operation of the current detecting circuit depicted in FIG. 11.

Finally referring to FIGS. 11 and 12, still another preferred example of the first signal producing circuit or current detector 51 comprises primary and secondary parts 116 and 117 which are electromagnetically coupled to each other by a coupling transformer 135. The primary and the secondary parts 116 and 117 comprises first and second windings 136 and 137 of the coupling transformer 135, respectively.

The primary part 116 additionally comprises an input resistor 139 having a first end connected, in the example being illustrated, to the second circuit terminal 17 and a second end connected to one end of the first winding 136 and furthermore to the above-mentioned second electrode of the smoothing capacitor 49 of the DC to DC converter circuit 41. An amplifier 141 is fed with the converter output signal and has an input terminal connected to the first end of the input resistor 139 to amplify a voltage drop which the loop signal develops across the input resistor 139. The amplifier 141 has an output terminal. As will presently become clear, an amplified voltage drop is produced between the output terminal of the amplifier 141 and the second end of the input resistor 139. A rectangular-wave generator 142 is driven by the converter output signal and is for generating a rectangular-wave signal, which serves as a local switching or control signal 143 (FIG. 12) of a local switching frequency 1/t. Responsive to the local switching signal 143, a switching element 144 intermittently connects the output terminal of the amplifier 141 with the other end of the first winding 136. Merely for convenience of illustration, the switching element 144 is depicted as a mechanical switch. It is now understood that the first winding 136 is intermittently supplied with the amplified voltage drop as illustrated at 145.

In the secondary part 117, an intermittent or chopped signal 146 is developed across the second winding 137. A rectifying circuit 147, which may be a half-wave rectifying circuit, has an input side connected across the second winding 137 to be responsive to the intermittent signal 146 for producing a positive going pulse sequence 148 on the output side thereof. One end of the output side is grounded. Supplied with the positive going pulse sequence 148, a low-pass filter 149 produces a smoothed signal $v_o$ with respect to ground. The smoothed signal $v_o$ is proportional to the loop signal and serves as the first output signal.

As pointed out in connection with the first and the second choke coils 44 and 48 (FIG. 2), it is possible to render the coupling transformer 135 compact and lightweighted by optimally selecting the local switching frequency 1/t.

While a few preferred embodiments of this invention have thus far been described, it will now readily be possible for one skilled in the art to carry this invention into effect in various other manners. For example, the DC to DC converter circuit 41 (FIGS. 2 and 7) and a combination of the DC to DC converter circuit 41 and the second signal producing circuit or voltage detector 69 (FIG. 8) may be modified in various ways. Above all, it is possible to make the two-transfer-function amplifier 71 produce the amplified signal by dealing with the second output signal rather than the first output signal.

What is claimed is:

1. A subscriber line circuit for delivering a loop signal of a variable voltage and a variable current to a subscriber substation through a two-wire line in response to a DC power and for supplying an exchange input signal to an input terminal of an exchange when said loop signal comprises a first communication signal delivered from said subscriber substation in a communication frequency band which is higher than a lower frequency band, said subscriber line circuit being responsive to an exchange output signal supplied from an output terminal of said exchange for making said loop signal comprise a second communication signal of said communication frequency band when said exchange output signal is in said communication frequency band, said subscriber line circuit being for connection to a reference voltage source and comprising:

a controllable DC to DC converter circuit responsive to said DC power for producing a converter output signal;

first signal producing means responsive to said loop signal for producing a first output signal representative of said variable current;

second signal producing means responsive to said loop signal for producing a second output signal representative of said variable voltage;

processing means having first and second transfer functions in said lower and said communication frequency bands, respectively, for processing a predetermined one of said first and said second output signals with said first and said second transfer functions to produce a processed signal;

first adding means for adding said processed signal to the other of said first and said second output signals to produce a first sum signal;

second adding means for adding said reference voltage to said exchange output signal to produce a second sum signal;

a blocking capacitor responsive to said second output signal for producing a capacitor output signal;

difference calculating means for calculating a difference between said exchange output signal and said capacitor output signal to produce a difference signal; and controlling means responsive to said first and said second sum signals for controlling said DC to DC converter circuit so as to render said first and said second sum signals substantially equal to each other and thereby to make said converter output signal and said difference signal provide said loop signal and said exchange input signal, respectively.

2. A subscriber line circuit as claimed in claim 1, wherein said first signal producing means comprises:

primary means responsive to said loop signal for producing optical rays dependent on said loop signal; and secondary means responsive to said optical rays for producing said first output signal.

3. A subscriber line circuit as claimed in claim 1, wherein said first signal producing means comprises:

primary means responsive to said loop signal for producing a magnetic field representative of said loop signal; and secondary means responsive to said magnetic field for producing said first output signal.

4. A subscriber line circuit as claimed in claim 1, wherein said first signal producing means comprises:

an input resistor through which said loop signal passes to develop a voltage drop thereacross dependent on said variable current;

an amplifier for amplifying said voltage drop to produce an amplified voltage drop;

a coupling transformer comprising primary and secondary windings;

means for intermittently supplying said amplified voltage drop across said primary winding to make said coupling transformer develop an intermittent signal across said secondary winding; and means responsive to said intermittent signal for producing said first output signal.

* * * * *